United States Patent [19]
Kitzman

[11] 3,915,045
[45] Oct. 28, 1975

[54] GUIDE FOR PORTABLE POWER TOOL
[76] Inventor: Richard A. Kitzman, 7153 N. 48th St., Milwaukee, Wis. 53223
[22] Filed: Apr. 7, 1975
[21] Appl. No.: 566,012

Related U.S. Application Data
[63] Continuation-in-part of Ser. No. 487,094, July 10, 1974, abandoned.

[52] U.S. Cl. ............... 83/745; 83/455; 30/376; 33/80
[51] Int. Cl.[2] .................. B27B 9/04; B27B 27/08
[58] Field of Search ..... 30/376; 83/745, 743, 471.3, 83/453, 454, 455, 467; 33/80, 120

[56] References Cited
UNITED STATES PATENTS

| | | | |
|---|---|---|---|
| 2,625,184 | 1/1953 | Harbert | 33/120 |
| 2,677,399 | 5/1954 | Getsinger | 83/467 |
| 3,085,343 | 4/1963 | Skripsky | 33/80 |
| 3,186,452 | 6/1965 | Magnussen | 83/745 |
| 3,586,077 | 6/1971 | Pease | 30/376 |

*Primary Examiner*—Willie G. Abercrombie
*Attorney, Agent, or Firm*—Henry C. Fuller

[57] ABSTRACT

A guide strip has a central raised rib or channel-shaped portion and two edge flange portions projecting outwardly from opposite side edges of the rib portion, one of the edge flange portions is flat to provide a clamping surface and the other has an upturned edge for guiding power tools. A splice strip or coupling is provided for joining the ends of two guide strips together to form a longer guide strip. The splice strip has a channel sized to interfit with the rib portion of the guide strips.

5 Claims, 5 Drawing Figures

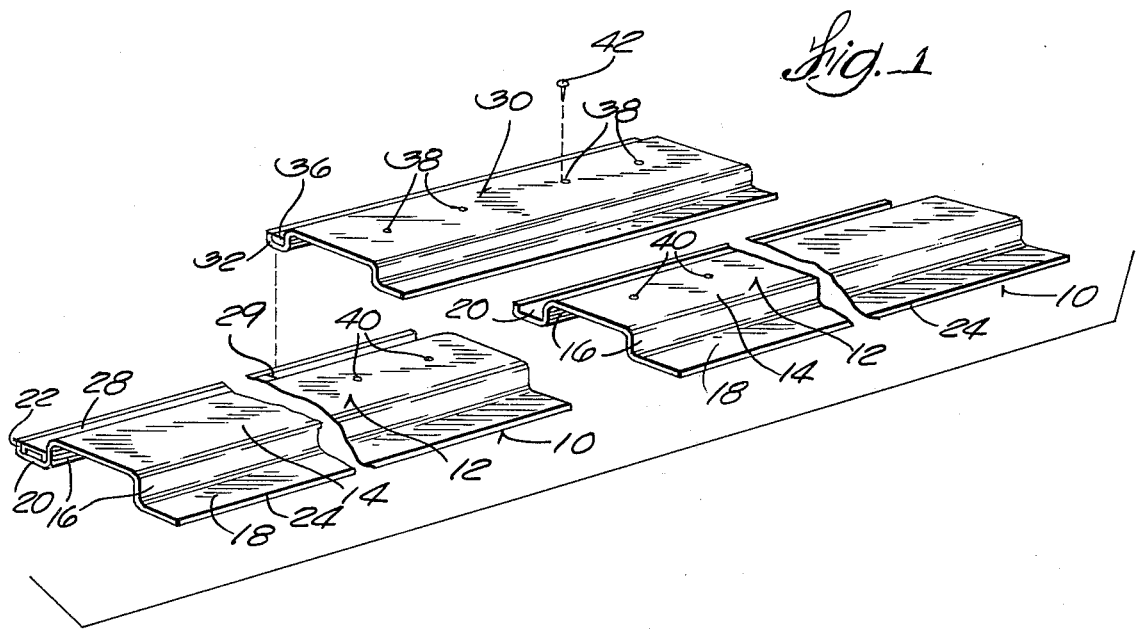
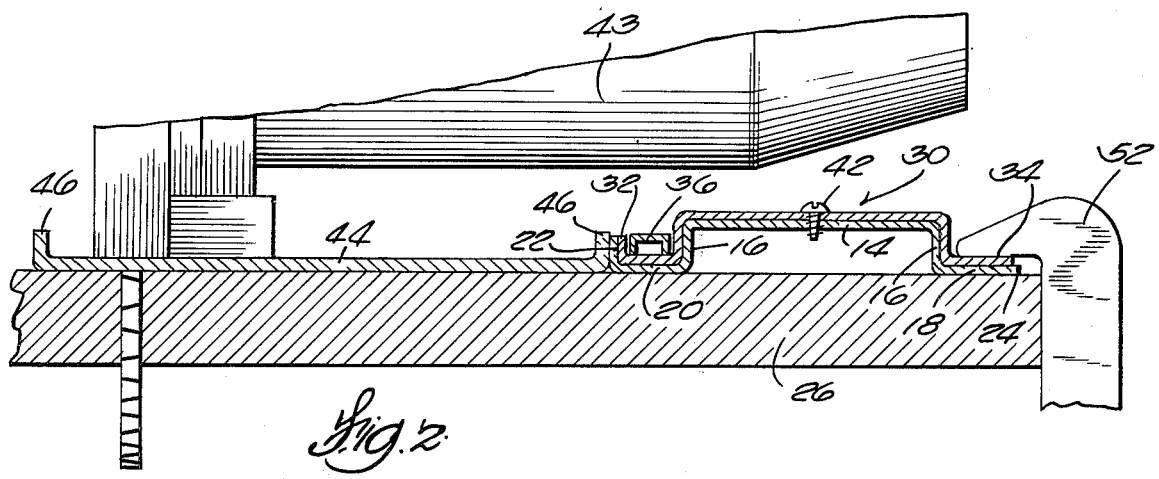
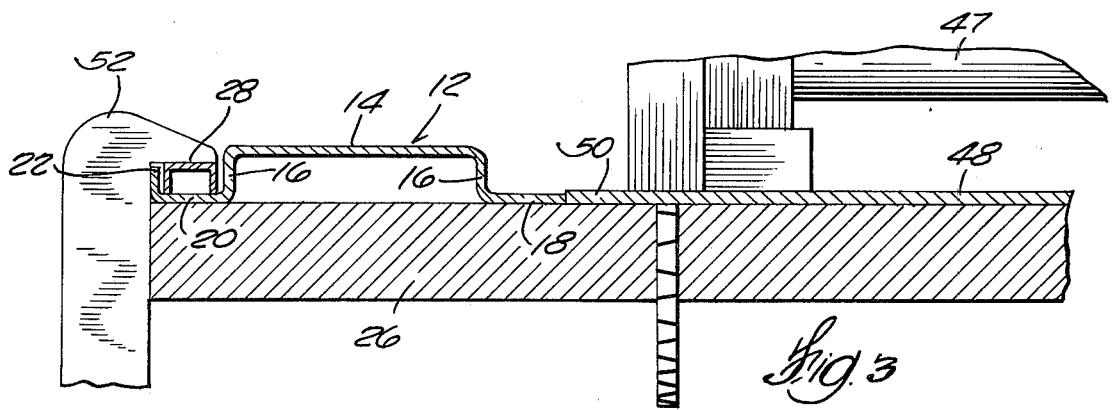

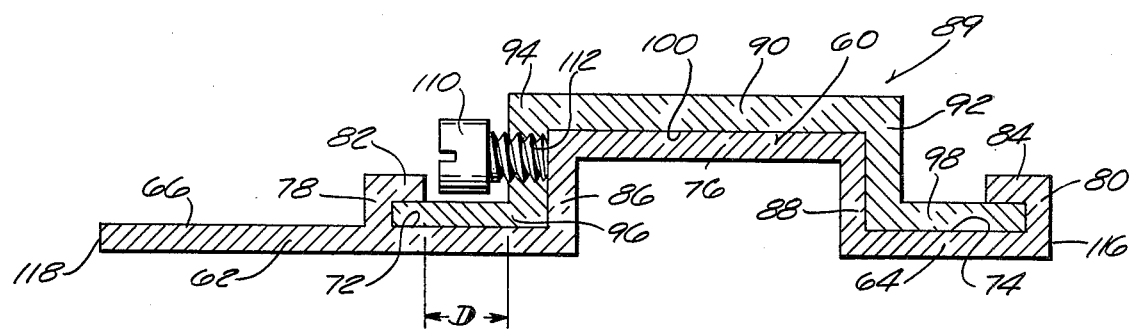
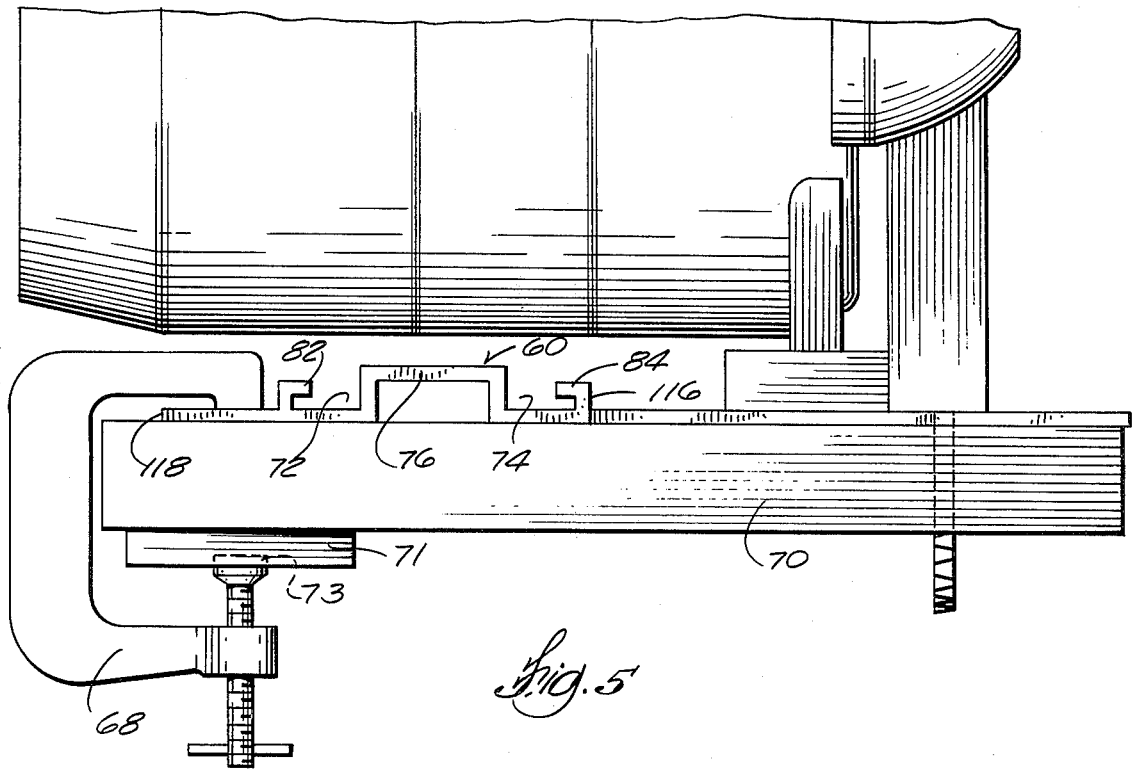

3,915,045

GUIDE FOR PORTABLE POWER TOOL

CROSS REFERENCE TO RELATED APPLICATION

This application is a continuation-in-part of my co-pending application Ser. No. 487,094, now abandoned.

BACKGROUND OF INVENTION

This invention relates to guide strips for portable power cutting tools. Such guide strips have been provided in the past as disclosed in U.S. Pat. Nos. 2,677,399; 3,586,077; and 3,085,343. But the guide strips disclosed in patents Nos. 2,677,399 and 3,586,077 have the drawback of requiring modifications in the portable power cutting tool in order to adapt the tool for use with the guide strips. The guide strip disclosed in U.S. Pat. No. 3,085,343 does not require modifications in the portable power cutting tool, but it has the drawback of being usable only with portable power cutting tools that have a flat sole plate as opposed to a sole plate with an upturned edge. U.S. Pat. No. 2,677,399 suggests that several guide strips can be connected end to end to form a longer guide strip but does not disclose the necessary joint means therefore.

SUMMARY OF THE INVENTION

In accordance with this invention, the above noted drawbacks are overcome by providing a guide strip having a central raised rib or channel portion and two edge flange portions projecting outwardly from opposite side edges of the rib portion, one of the edge flange portions is flat to form a clamping surface and the other has an upturned outer edge so that the guide strip can be used to guide power cutting tools, scribers or the like. The splice or coupling is provided with outturned flanges which are received in slots in the connected guide strips to afford longitudinal displacement only of the splice for purposes of assembly and disassembly.

Further objects, advantages and features of the invention will become apparent from the following disclosure.

DESCRIPTION OF THE DRAWINGS

FIG. 1 is an exploded perspective view showing two guide strips of this invention and a splice strip for joining the ends of the guide strips together to form a longer guide strip.

FIG. 2 is a cross-sectional view showing the central portion of the guide strip of FIG. 1 clamped on a workpiece to guide a portable power cutting tool having a sole plate with an upturned edge.

FIG. 3 is a cross-sectional view showing an end portion of the guide strip of FIG. 1 clamped on a workpiece to guide a portable power cutting tool having a flat sole plate.

FIG. 4 is a sectional view of a modified embodiment of the invention.

FIG. 5 is an elevational view of the embodiment shown in FIG. 4 showing the guide strip in use.

DESCRIPTION OF THE PREFERRED EMBODIMENT

Although the disclosure hereof is detailed and exact to enable those skilled in the art to practice the invention, the physical embodiments herein disclosed merely exemplify the invention which may be embodied in other specific structure. The scope of the invention is defined in the claims appended hereto.

Referring to FIG. 1, the guide strip comprises an elongated strip 10 having a raised central rib portion 12 made up of a top 14 and two downwardly-extending legs 16. In this particular embodiment, the rib portion 12 is rectangular in cross-sectional shape, but rounded rib portions could be used in other embodiments of the invention if desired.

A pair of edge flange portions 18 and 20 project laterally outwardly from the bottoms of opposing rib legs 16. Edge flange portion 18 is flat, and edge flange portion 20 has an upturned outer edge 22. The outer edges of flange portions 18 and 20 are linear so as to serve as a guide for a portable power cutting tool, the outer edge 24 of flange portion 18 being used as a guide for portable power cutting tools having a flat sole plate, and the upturned outer edge 22 of flange portion 20 being used as a guide for portable power cutting tools with a sole plate having an upturned edge. In the latter case, the guide strip 10 is clamped to the workpiece 26 via flat flange portion 18, as shown in FIG. 2. A filler strip 28 is preferably welded into the channel formed by flange portion 20, leg 16 and upturned outer edge 22 as shown in FIG. 3 so that the guide strip 10 can be clamped to workpiece 26 via flange portion 20 when the flat flange portion 18 is to be used as the guide edge.

Although only one guide strip 10 may be provided, it is preferable to provide two guide strips 10 as shown in FIG. 1 which are adapted to be clamped together end-to-end by a splice strip 30 which has the same cross-sectional shape as guide strips 10 but is dimensioned to nest on top of the guide strips 10 as shown in FIG. 2, with the upturned side edge 32 being equal in height or shorter than upturned side edge 22 to accommodate a clamp and the flat flange 34 being equal in length or shorter than flat flange 18 so that the outer edge 24 thereof can be used as a guide strip. A filler strip 36 is preferably welded in splice strip 30 adjacent to side 32 to adapt splice strip 30 to be clamped to the workpiece. The filler strip, however, can be a separable piece. Filler strip 36 is similar in shape to filler strip 28 but is smaller in its dimensions to fit in the smaller channel of splice strip 30.

Registered holes 38 and 40 are drilled in the top of splice strip 30 and guide strips 10 so that the two guide strips 10 can be fastened together in end-to-end relationship by self-tapping sheet metal screws 42. The filler strips 28 in guide strips 10 terminate short of the ends containing holes 40 as shown at 41 in FIG. 1 so that splice strip 30 will nest on top of guide strips 10 as shown in FIG. 2.

The guide strip 10 of this invention can be used in combination with any suitable portable power cutting tool such as a circular saw, saber saw, router, or the like. Some of these tools have sole plates 44 (FIG. 2) with upturned outer edges 46, and some have sole plates 48 (FIG. 3) with flat edges 50. One important feature of this invention is that it is capable of being used equally well with either flat sole plates or those having upturned edges. With a power tool 43 having upturned edges 46 on sole plate 44, the guide strip 10 is clamped in the appropriate position on workpiece 26 by a clamp 52 which rests upon either flat flange portion 18 of guide strip 10 or flat flange portion 34 of splice strip 30 as shown in FIG. 2. With a power tool 47 having flat edges 50 on sole plate 48, the guide strip 10 is clamped in the appropriate position on workpiece 26 by resting clamp 52 on the top of filler strip 28 as shown in FIG. 3 or on top of filler strip 36 (FIG. 2). No modification of the power tool or the guide strip is required in either case.

FIGS. 4 and 5 show a modified embodiment of the invention in which the guide strip 60 has two laterally extending flanges 62, 64. The flange 62 has a length greater than the flange 64 to provide a clamping surface 66 which is engaged by a C-clamp 68 to secure the guide strip to a work table 70. A pad 71 with a recess 73 can be provided for use with the C-clamp. The guide strip 60 also includes slots 72, 74 located on opposite sides of a raised rib or channel portion 76. The slots 72, 74 are defined in part by the flanges 62, 64. The slots are also defined in part by upturned wall portions 78 and 80 which have inturned flange portions 82, 84. Rib walls 86, 88 complete the slot structure.

The splice or coupling 89 for connecting two guide strips 60 in assembly comprises a wall portion 90 with leg portions 92, 94 which have outturned foot portions 96, 98 which are sized in thickness to fit between the flanges 62 and 82 and 64 and 84 of the slots 72, 74. The wall portions 94, 90, 92 define a recess or channel 100 which receives the ribs 76 of the guide strips in a close fit to maintain the edges of adjoined guide strips in alignment.

The splice 89 is secured to the rib portion of both guide strips being assembled by a plurality of bolts 110 which are threadably received in threaded apertures 112 in wall portion 94 of the splice. There are preferably two bolt or set screws for each guide strip. The distance D as shown in FIG. 4 is preferably of a length less than the length of the set screws 110 so that when the guide strips and slice are assembled the bolts will not come out of the threaded apertures even though loose. This greatly facilitates storage. For instance, when the guide strip is not in use all the screws can be loosened, the splice slid into an appropriate position on one guide strip and one screw tightened to hold the splice to the guide strip.

As shown in FIG. 5 the surface 116 provides the guiding surface for all power tools whether they have an upturned base plate as shown in FIG. 2 or a flat base plate as shown in FIG. 3. The surface 116 can also be employed as a straight edge for marking purposes. The surface 118 can also be used as a straight edge for marking but it normally would not be used as a guide surface for power tools if C-clamps are employed to clamp the guide strip assembly to a work table or to the material being cut.

The splice or coupling is an important feature of this invention inasmuch as plywood panels normally come in rectangular sheets which measure four feet by eight feet. With panels this size, a four-foot guide strip is too short for the long side of the panel and an eight-foot guide strip is too long for the short side. But two four-foot guide strips that can be fastened together to form an eight-foot guide strip enables the craftsman to conveniently guide the power tool either way on the standard panel using one of the four-foot guides for the four-foot side and both of the four-foot guides for the eight-foot side.

I claim:

1. Guide means for guiding a tool along a straight line on a workpiece comprising a first guide strip having two laterally extending flanges and an upwardly projecting rib portion, wall means defining a slot located adjacent said rib portion, said slot being defined in part by one of said laterally extending flanges, one of said flanges including an upturned marginal wall at right angles with its associated flange to guide a tool and including a splice means for securing said guide strip to a second guide strip said splice means including wall means defining a recess for receiving said rib portion, an outturned flange projecting from said wall means defining a recess and extending into said slot and fasteners for securing said splicing means to said guide strip portion.

2. Guide means in accordance with claim 1 including a second slot and wherein said slots include inwardly extending wall portions spaced above said flange portions to afford longitudinal assembly of said splice means with said guide strip portions.

3. Guide means in accordance with claim 2 including threaded through apertures in said wall means defining a recess, bolts threadably received in said apertures and engaged with said rib portion.

4. Guide means in accordance with claim 3 wherein said bolts have heads located between said outturned wall means and said inwardly extending wall portions being spaced from said apertured wall means a distance greater than the length of said bolts to prevent complete removal of said bolts when said splice is assembled on said guide strip.

5. Guide means in accordance with claim 1 wherein one of said laterally extending flanges has a length greater than the other of said flanges to provide a clamping surface.

* * * * *